US007575500B1

United States Patent
Salter et al.

(10) Patent No.: US 7,575,500 B1
(45) Date of Patent: Aug. 18, 2009

(54) METHOD AND MULTI-PURPOSE APPARATUS FOR CALLING TURKEYS

(75) Inventors: Eddie Salter, Evergreen, AL (US); Ron M Bean, Cedar Rapids, IA (US)

(73) Assignee: Hunter's Specialties, Inc., Cedar Rapids, IA (US)

( * ) Notice: Subject to any disclaimer, the term of this patent is extended or adjusted under 35 U.S.C. 154(b) by 436 days.

(21) Appl. No.: 11/164,265

(22) Filed: Nov. 16, 2005

(51) Int. Cl.
*A63H 5/00* (2006.01)
(52) U.S. Cl. .................................... 446/397; 446/418
(58) Field of Classification Search ............. 446/397, 446/421, 422, 418
See application file for complete search history.

(56) References Cited

U.S. PATENT DOCUMENTS

| | | | | |
|---|---|---|---|---|
| 4,343,108 A | * | 8/1982 | Lee | 446/397 |
| 4,941,858 A | * | 7/1990 | Adams | 446/397 |
| D360,160 S | * | 7/1995 | Morningstar | D10/119 |
| 6,168,493 B1 | * | 1/2001 | Kirby | 446/418 |
| 6,669,528 B2 | * | 12/2003 | Kaelin | 446/397 |
| 2003/0114073 A1 | * | 6/2003 | Kaelin, II | 446/200 |
| 2006/0252341 A1 | * | 11/2006 | Olinde | 446/202 |

OTHER PUBLICATIONS

See the "Background of Invention" section on pp. 1-2 in the specification of this patent application.
Admitted prior art—Hunter's Specialties' web page showing various turkey box calls (3 pages).

* cited by examiner

*Primary Examiner*—Gene Kim
*Assistant Examiner*—Alyssa M Hylinski
(74) *Attorney, Agent, or Firm*—Simmons Perrine Moyer Bergman PLC

(57) ABSTRACT

A multi-purpose box call having an outside of the box and offset self-centering extension arm to constrain the lid, which permits generation of turkey cutting noises via merely repeatedly tapping an end of the lid in a single direction. No grasping or twisting of the lid is necessary, and no need to locate the proper orientation between the lid and the box is necessary. The box call can be played in a normal manner by removing or overpowering the rubber band.

18 Claims, 5 Drawing Sheets

METHOD AND MULTI-PURPOSE APPARATUS FOR CALLING TURKEYS

FIELD OF THE INVENTION

The present invention generally relates to hunting accessories, and more particularly relates to hunting game calls, and even more particularly relates to methods and systems for calling turkeys using a box call.

BACKGROUND OF THE INVENTION

In the past, hunters have used various devices to call turkeys, such as the ubiquitous box call, in which a paddle or lid is dragged across one or two top edges of an open or hollow attached box to generate sound. Numerous variations of box calls have been used in the past. The various types of calls have included features directed to a variety of perceived problems with then existing calls. One variety of box calls in the past has utilized a simple rubber band disposed around the lid and box and located toward the far end of the box call from the connection point between the lid and the box.

Another variety has used a rubber band coupled to a central location on either the underside of the lid or the top side of the lid. Such a design is used in the Model #00882 . . . Champion Yelper Natural turkey box call sold by Hunter's Specialties of Cedar Rapids, Iowa. This model has also been equipped with a second rubber band as described in the immediately preceding paragraph.

While these box calls and their various improvements have many advantages, they also have significant drawbacks.

In general, the skill required to successfully operate these box calls (which were designed to increase the ease of use of the call) is still often more than is possessed by inexperienced hunters or hunters who may use such a call only a few days or weeks each year. Many hunters are intimidated by such calls, fearing that they are difficult to operate correctly. Variations in force and angle of the lid can change a simple yelp to a cut, a purr to a putt or a cluck to a fly-down cackle. The variations in tone and vocalizations are many, and, therefore, a box call often requires a modicum of hands-on practice to use effectively in the field.

The simple rubber band around the entire call holding the lid toward the box helps to provide a somewhat constant pressure downward onto the box edge. However, it does not help position the call laterally other than centered over the box.

The prior devices, such as the Model #00882 . . . Champion Yelper Natural turkey box call sold by Hunter's Specialties of Cedar Rapids, Iowa, with a rubber band attached to a central location on the lid and to a side location in the box, also helps to provide a downward force and even provide for a lid to be held in a position very slightly askew with respect to the box. But they do not provide for skewing the lid to the optimal position, nor do they provide for re-centering the lid to a significantly skewed position.

Consequently, there exists a need for improvement in game calling methods and apparatuses.

SUMMARY OF THE INVENTION

It is an object of one embodiment to provide a system and method for calling game in an effective manner.

It is a feature of one embodiment to utilize an offset lid location optimizing and centering system.

It is an advantage of one embodiment to increase the ease with which a box call can be effectively utilized.

One embodiment of the present invention is an apparatus and method for calling game, which is designed to satisfy the aforementioned need, provide the previously stated object, include the above-listed feature, and achieve the already articulated advantage. The present invention is carried out in a "finesse-less" manner in the sense that the requisite level of skill to effectively use the call to create a turkey "cutting" sound has been greatly reduced. The present invention is also carried out in an "experimentation-less" manner in a sense that the amount of experimentation needed to learn how to consistently make "cutting" sounds and how to consistently avoid making unwanted sounds, has been greatly reduced.

Accordingly, the present invention is a system and method comprising a box call with an offset lid location optimizing and self-centering mechanism.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
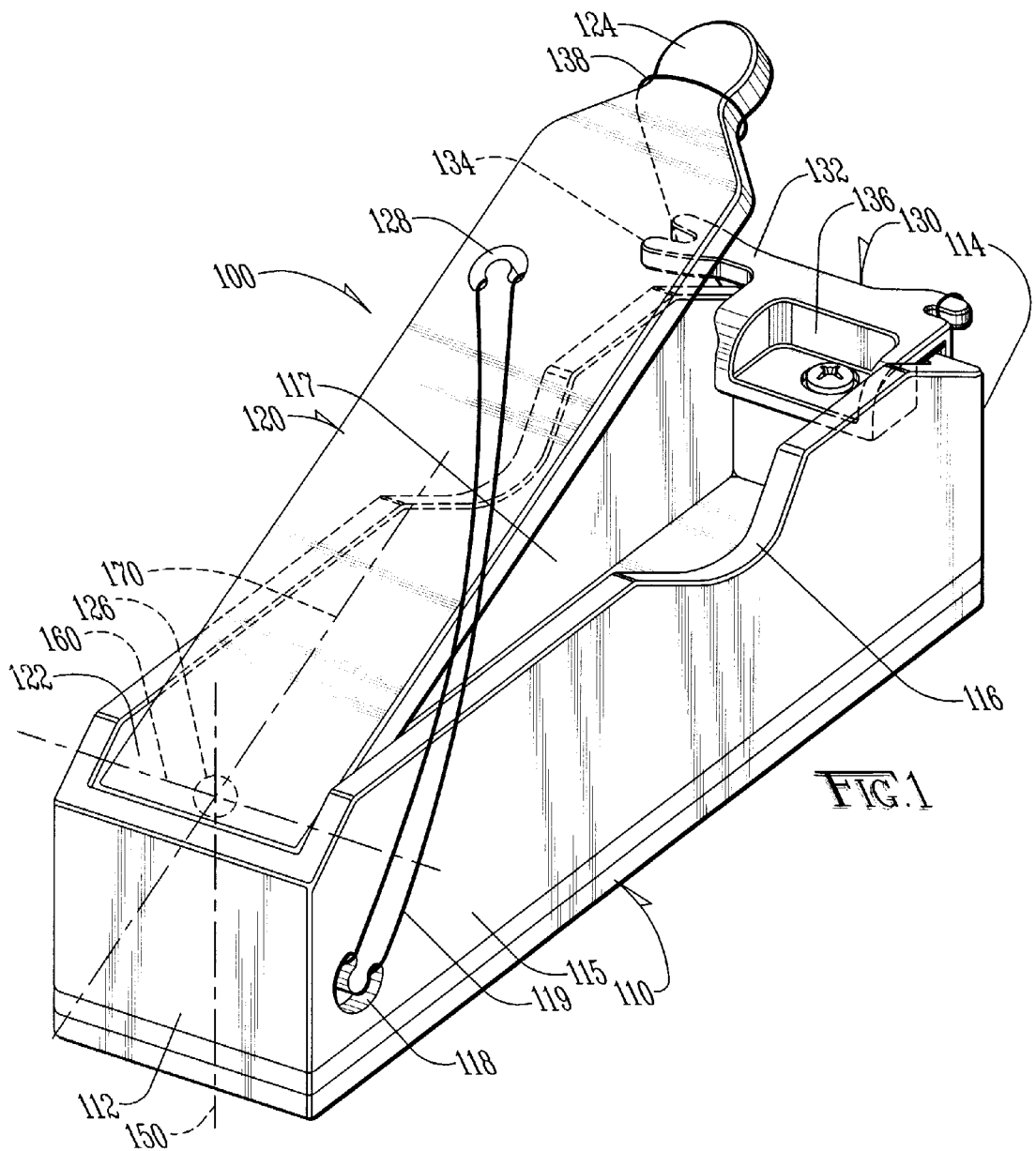
FIG. 1 is a perspective view of one embodiment where the lid is positioned in a non-resting position askew with respect to the box; the dotted lines represent axes about which the lid is pivotable.

Now referring to the drawings, where like numerals refer to like matter throughout, and more particularly to FIG. 1, which shows one embodiment of a box call, generally designated 100, having a box 110 with a front end 112 and rear end 114. The box 110 is very similar to box call boxes of the prior art and especially similar to Model #00882 . . . Champion Yelper Natural turkey box call sold by Hunter's Specialties of Cedar Rapids, Iowa. Paddle or lid 120 is shown having a front end 122 and a rear or handle end 124. Lid 120 is shown coupled to the box 110 via a multi-directional coupling 126 which may permit the lid to pivot horizontally around a vertical axis 150 shown by a dotted line, pivot up and down around a horizontal axis 160 and to twist around a longitudinal axis 170. Couplings which can accomplish one, two or all three of these types of motions are well known in the art, and the precise type of coupling is a matter of design choice. The intended invention is intended to include such a coupling, but not to be limited to any one type of such coupling. A coupling built as follows may be considered preferred in some situations. The paddle is usually connected to the box at one end using a screw with a spring spacer. The spring is used to keep the end of the paddle supported above the box call side boards. At the opposite end of the paddle (in a central location) is a hole that one end of the rubber band is secured, the path of rubber band then goes down through the notch 134 of the extension arm 130 and then is brought up through notch 136 and is secured on the outer fork of notch 134. The coupling may be either direct or indirect and may or may not involve physical contact between the lid 120 and the end piece of front end 112.

One of the innovative aspects of one embodiment is achieved because of the protuberance or extension arm, generally designated 130, having an outboard end 134, a box attaching section 136 and a point 132 where outboard extension begins. The extension arm 130 is coupled to the lid 120 via biasing member 138, which may be an elastic member, rubber band, spring or other resilient member suitable to allow the lid to deviate from a resting position and bias the lid 120 back to a resting position when no lid manipulating force is being applied to the lid 120. The position as shown in FIG. 1 is not a resting position; it is shown in such a perturbed position with an exaggerated angle between the lid 120 and the side 117. This perturbation of the location of the lid 120 and the exaggeration of the angle is included to better show the extension arm 130 with respect to the side 117. In a resting position, the biasing member 138 would generally be vertical or having its shortest possible length. This permits the call to be self centering in that if the lid is perturbed, it will return to its resting location irrespective of which direction the lid 120 is moved.

In the embodiment of FIG. 1, side 117 is the only sounding board side; however, it should be understood that side 115 could be a sounding board, or other known dual-sounding board configurations could be substituted.

The combination of eyelet 128, front rubber band 119 and front rubber band connection notch 118 provides for a downward pressure of the lid on the side 117 and a force which tends to resist motion of the lid which is especially useful when the multi-function box call is used in a typical manner as prior art box calls.

The exact type of extension arm 130 and the exact type of biasing member 138 will be a matter of design choice. However, the fact that a biasing member 138 applies a bi-directional restoring force on a lid 120 directed toward a location outboard of the box 110, is believed to be beneficial and innovative. The dimensions and location of extension arm dictate the at-rest location of the lid 120. This outward extension dimension can be selected so as to play a "sweet" spot or ideal location on the lid 120 to strike on a location on the side 117. The extension arm 130, shown in the figures, is a fixed dimension. However, it should be understood that adjustments in the dimension are contemplated. Such dimension adjustments could be accomplished by replacing the extension arm 130 with another having a different outward extension dimension. Alternately, the extension arm itself could be configured to be adjustable in length, thereby allowing for fine tuning of the sound produced when the extension arm 130 is used to simply generate "cutting" calls.

Figure 2:
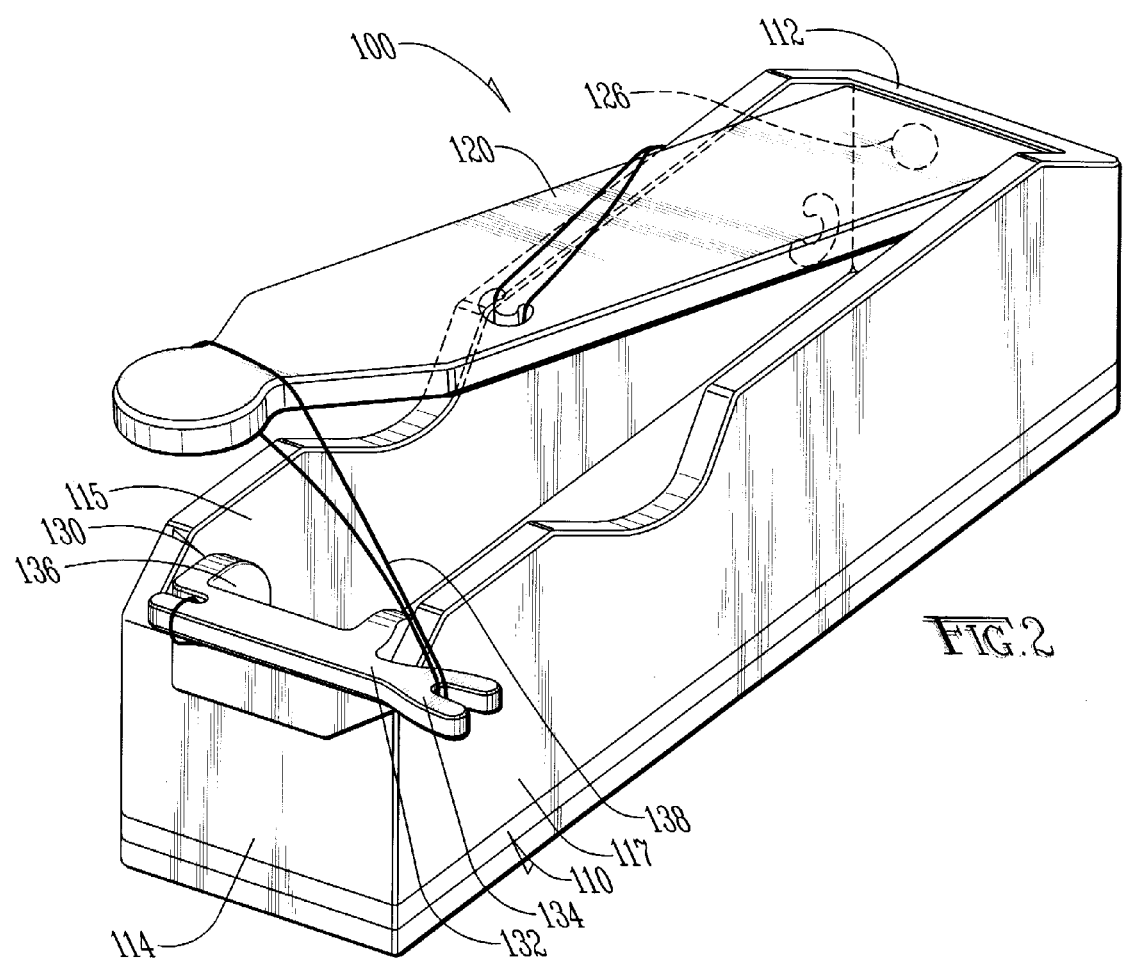
FIG. 2 is a partially cut-away perspective view of the embodiment of FIG. 1 which shows an opposing side and shows the paddle in a resting position; the cut-away portion of the lid 120 reveals the extension arm in combination with a rubber band.

Now referring to FIG. 2, there is shown a perspective view of the box call 100 of FIG. 1 showing an opposing side. The outboard end 134 of the offset extension art 130 is revealed by the cut-away portion of the lid 120 and clearly that outboard end 134 is outwardly of the box 110 and beyond the point 132. Additionally, it shows that the biasing member 138 is generally vertical with respect to the extension arm 130. The box attaching section 136 is clearly shown as being generally horizontal and disposed on a top edge of the rear end 114 of the box 110. It should be understood that the box attaching section 136 need not be so configured, and horizontal attachment on a back side of the rear end 114 or vertically along a side of the box 110 clearly substitutes. Other suitable configurations of attachment of an extension arm 130 are envisioned as well. The location of the extension arm 130 is shown at the rear end 114 of the box. This may be preferred, but locations other than the rear end 114 and closer to the front end 112, could be used as well.

The function of a pulling force to an outboard location could also be performed by a pushing force from some location on the box 110 toward an outboard location, such as by using a compressed spring, hydraulic or pneumatic plunger. Other structures and configurations could be substituted and still perform the function of biasing the lid 120 to a substantially skewed relationship with respect to the box 110.

Figure 3:
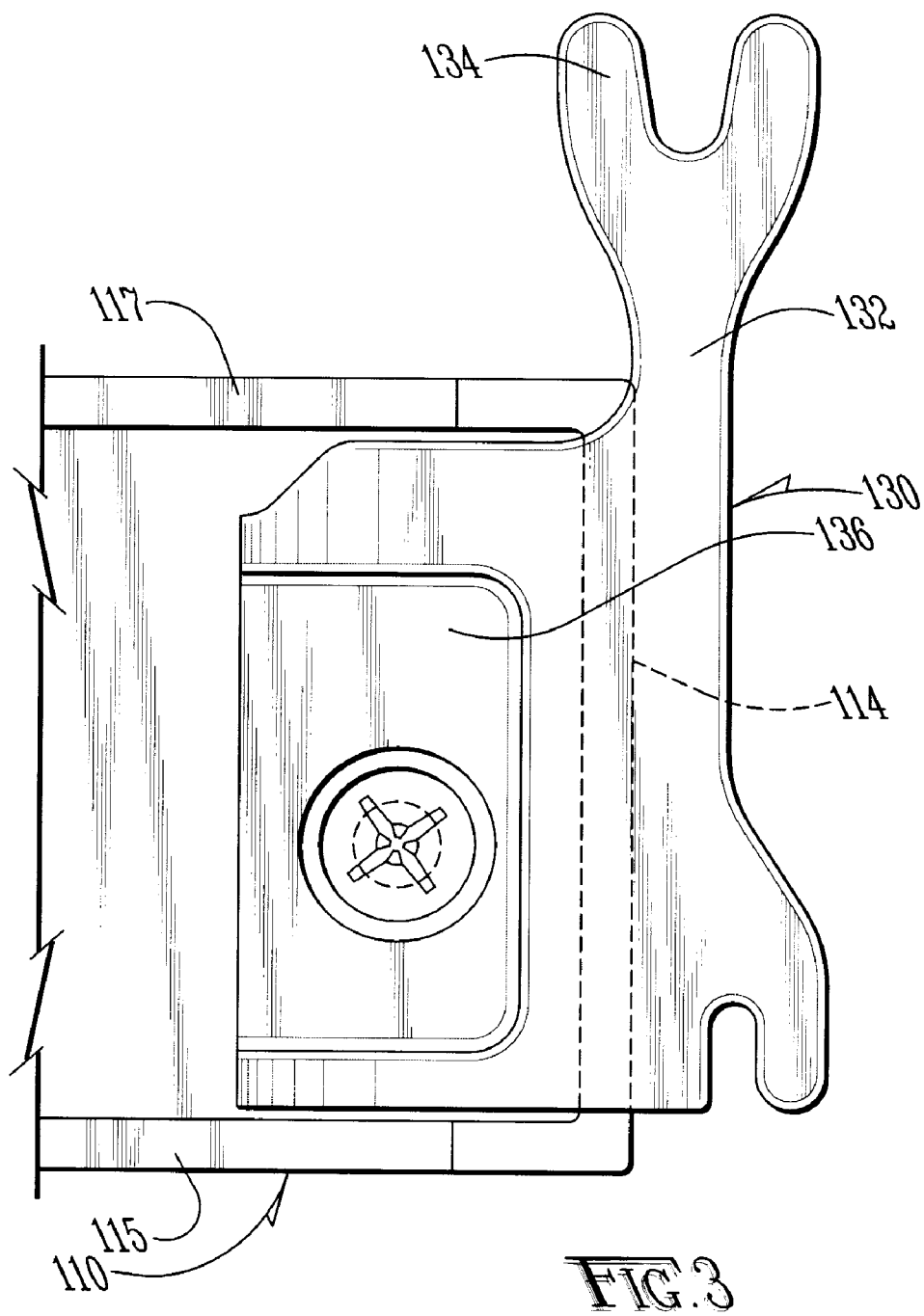
FIG. 3 is a close-up plan view of one embodiment where the lid is displaced to expose a top side of the extension arm.

Now referring to FIG. 3, there is shown a top or plan view of the rear end 114 and extension arm 130 combination of FIGS. 1 and 2.

In operation, the method of the present invention can be performed as follows:

A lid 120 is provided with some means to provide a force which biases the lid 120 to a substantially skewed position with respect to the box 110.

The lid 120 is then merely tapped so as to move the lid 120 from the resting skewed position to either a less skewed orientation or an even more skewed orientation. The lid 120 contacts a top edge of side 117 and thereby generates a predetermined desired sound. The biasing force then returns the lid 120 to the skewed resting position from which it can again be tapped to produce a very similar sound.

One beneficial aspect of one embodiment of the present invention is that the box call 110 can be used as discussed above with the mere repeated tapping of the lid 120 to repeatedly produce the same or very similar predetermined desired sounds, as well as to allow for typical operation of the box call such as would be done with a prior art box call either by overpowering the biasing force or by temporarily disconnecting the structure which provides the biasing force on the lid 120. This multi-use or convertible configuration is one beneficial aspect of one embodiment. In the embodiment shown in FIGS. 1-3, the rubber band 138 can be merely removed, and then the box call 100 can be operated as would a typical prior art box call. A sound port/thumb rest 116 inside 115, as was known in the prior art, is shown in FIG. 1, so as to permit the normal or typical operation of the box call. A sound port/thumb rest 116 may be inside 117 or omitted entirely.

Figure 4:
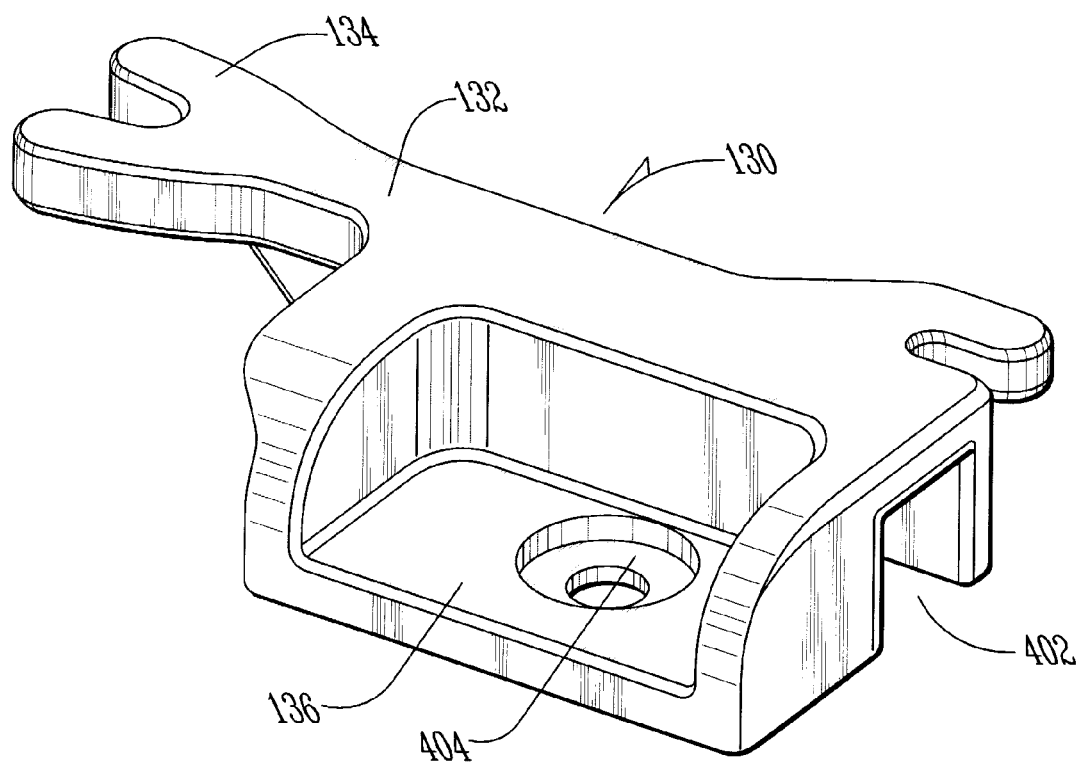
FIG. 4 is a close-up perspective view of an embodiment of the extension arm of FIGS. 1-3.

Now referring to FIG. 4, there is shown a close-up perspective view of the extension arm 130, which includes a second slot 402 for receiving the rubber band 138 when it is wrapped around the rear end 114 of the box call. A screw hole 404 is also shown for receiving a screw to retain the extension arm 130 to structure at the rear end 114.

Figure 5:
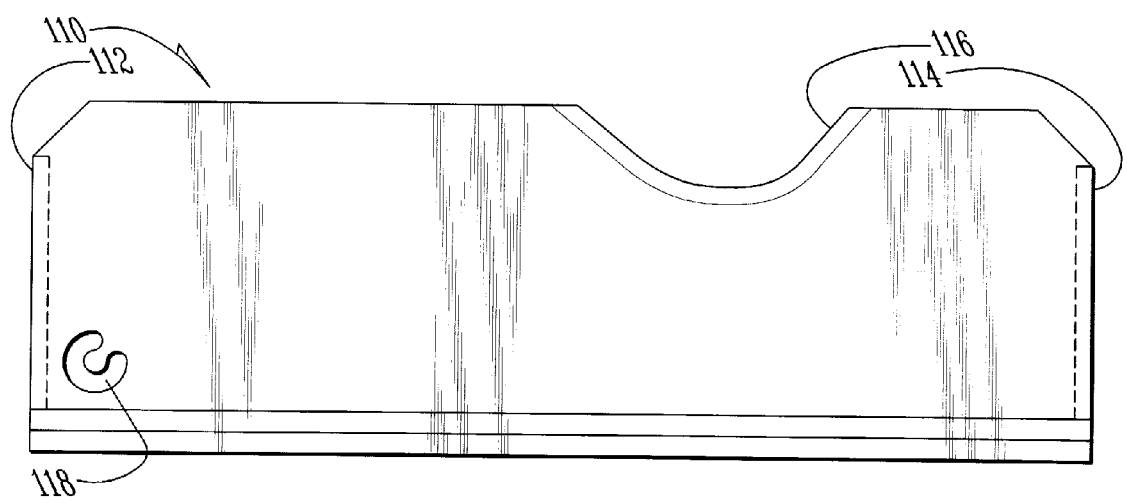
FIG. 5 is an elevation view of one side of the box call of FIGS. 1-3.

Now referring to FIG. 5, there is shown a side view of side 115, which shows more detail with respect to the front rubber band connection notch 118 and the sound port/thumb rest 116.

The materials for the components of box call 100, except for the coupler 126, front rubber band 119 and the biasing member 138, are preferably rugged, rigid and lightweight. Numerous well-known suitable materials can be used to accomplish the present invention.

It is thought that the method and apparatus of the present invention will be understood from the foregoing description, and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. A multi-purpose box call comprising:
   a box call comprising a box having a front end and a rear portion, a first side and a second side, a bottom and a lid which is coupled to the front end, so as to be permitted to manipulate horizontally and vertically; the lid further having a front lid attachment end and rear lid handle end;
   an arm disposed at the rear portion and comprising an outward end disposed outwardly beyond the rear portion, and the outward end being disposed substantially perpendicular to the first side and a longitudinal axis extending between the front end and the rear portion;

a biasing member coupled to the outward end and to a connection point on the lid toward the rear lid handle end, the biasing member coupled so as to provide a force extending to a location outside of the box;

the biasing member and the extension arm being configured to hold the lid, while at rest, at an angle skewed with respect to the first side so that the front lid attachment end is located more inside of the first side than is the rear lid handle end;

wherein the biasing member moves the connection point back to a location outside of the box, when the lid is perturbed from a resting position in either direction.

2. The game call of claim 1 wherein the biasing member is directly coupled to the connection point on the lid toward the rear lid handle end.

3. The game call of claim 2 wherein the biasing member comprising an elastic member which moves the lid toward a location outside of the box.

4. The game call of claim 3 wherein the elastic member is a rubber band.

5. The game call of claim 1 wherein the lid is directly coupled to the front end.

6. The game call of claim 1 wherein the arm is disposed at a rear end of the rear portion.

7. The game call of claim 1 wherein the arm is a removable member.

8. The game call of claim 1 wherein the arm is not adjustable and has a fixed dimension between the outward end and a point of attachment with the rear portion.

9. The game call of claim 1 wherein the first side serves as a sole sounding board, the biasing member is disposed in a vertical orientation with respect to the arm when the lid is at a resting position, further comprising a front rubber band extending from a eyelet centrally disposed on the lid and a point of attachment toward the front end.

10. A method of using a box call for calling turkeys comprising the steps of:

providing a box call comprising a box, a lid and means to orient the lid so as to be disposed with a predetermined resting skewed arrangement with respect to a longitudinal axis of the box call and to permit perturbations of the location of the lid, in a plurality of opposing directions, and automatically return the lid to the predetermined skewed resting arrangement;

causing a series of discrete manual impacts upon the lid so as to repeatedly move the lid in a first direction, thereby creating a series of similar sounds which mimic turkey vocalizations, such that time is allowed between each of the series of discrete manual impacts for the lid to automatically return to the predetermined resting skewed arrangement;

wherein the means to orient the lid so as to be disposed with a predetermined resting skewed arrangement comprises an outwardly extending arm, extending outwardly from the box, with an attached rubber band, where one end of the rubber band is attached outside of the box to the outwardly extending arm and an opposing end of the rubber band is coupled to a connection point on an otherwise free end of the lid;

the connection point being disposed outside of the box when the lid returns to the predetermined skewed arrangement.

11. The method of claim 10 where the vocalizations of a turkey are cutting vocalizations.

12. A method of using a game call comprising the steps of:

providing a box call, comprising a box and a lid having an attachment end and an opposing free handle end which is used for striking a sounding board, said box further having a protuberance thereon located nearer said free handle end than said attachment end, the protuberance further extending perpendicular to a plane of the sounding board;

coupling an elongated flexible member between the protuberance and a connection point on the lid, so as to hold the lid in a predetermined skewed relationship with respect to the sounding board, and to return the lid to the predetermined skewed relationship with the connection point outside of the box when the lid is tapped in either a first direction or an opposing second direction;

without grasping the lid, tapping a portion of the lid, thereby causing it to move in the first direction, and thereby generate a sound which mimics a turkey vocalization; and after the lid automatically returns to the predetermined skewed relationship, without grasping the lid, tapping a portion of the lid, thereby causing it to move in the second direction and thereby create a sound which mimics the turkey vocalization;

after the lid automatically returns to the predetermined skewed relationship, without grasping the lid, tapping a portion of the lid, thereby causing it to again move in the second direction and thereby create a sound which mimics the turkey vocalization.

13. The method of claim 12 wherein the elongated flexible member is an elastic member.

14. The method of claim 13 wherein the elastic member is a rubber band.

15. The method of claim 12 wherein the elongated flexible member is oriented vertically with respect to a longitudinal axis of the protuberance, so as to cause the lid to return to the predetermined skewed relationship irrespective of a direction of impact upon the lid.

16. The method of claim 12 wherein the protuberance has a fixed longitudinal axis so as to maintain the predetermined skewed relationship in a substantially constant configuration.

17. The method of claim 12 wherein the protuberance is a detachable extension arm with fixed dimensions.

18. A game call for creating sounds which mimic vocalizations of a turkey, the game call comprising:

a box call defining a closed space comprising a first side, a second side, a front, a back, a bottom and a lid which is pivotally movable with respect to the first side;

a protuberance extending out from the first side of the box call, the protuberance extending on a protuberance side which is not between the first side and the second side;

an elastic member coupled to the protuberance and to the lid;

the elastic member being positioned so as to hold a connection point between the lid and the elastic member in a position outside of said box call and on the protuberance side of the first side;

the elastic member being further positioned and configured so that a lid returning force caused by the elastic member causes the lid to automatically move toward the protuberance when the lid is perturbed in a direction causing it to move toward or away from the second side.

* * * * *